July 17, 1962  SHIH-YING LEE  3,044,480
FLUID FLOW CONTROLLER
Filed Nov. 16, 1956  2 Sheets-Sheet 2

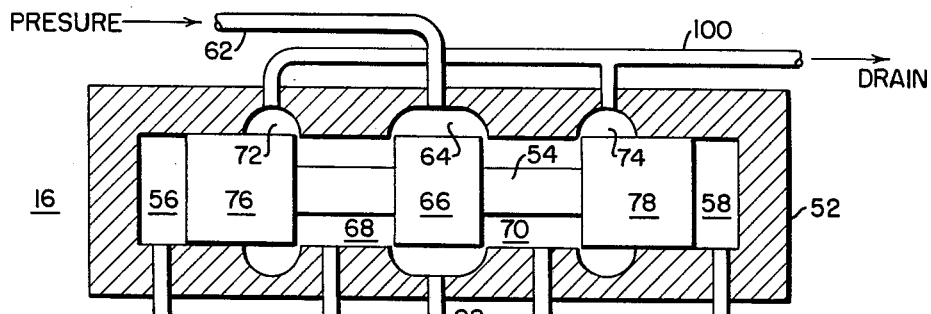

INVENTOR.
SHIH-YING LEE
BY Kenway, Jenney, Witter
& Hildreth
ATTORNEYS

United States Patent Office 3,044,480
Patented July 17, 1962

3,044,480
FLUID FLOW CONTROLLER
Shih-Ying Lee, Watertown, Mass.
(Huckleberry Hill, South Lincoln, Mass.)
Filed Nov. 16, 1956, Ser. No. 622,638
17 Claims. (Cl. 137—85)

The present invention relates to fluid flow control, and more particularly to a fluid flow controller or valve having novel features of construction and advantageous flow control characteristics.

A fluid flow controller, sometimes termed a transfer valve, is employed to control fluid flow as a function of a low-level input signal, such as a force, an electric current, or other form of input control. Existing forms of fluid flow controllers, as applied to the control of fluid to reversible hydraulic motor by way of example, have generally employed some form of four-way valve. If a motor of appreciable power output is to be controlled from a low energy source such as an electrical signal, generally the four-way valve is actuated by a pilot valve to obtain the requisite power amplification. The pilot valve may be operated either mechanically or by an electro-mechanical transducer from the low-level input. The pilot valve/power valve relationship is generally such that the displacement of the power valve element is proportional to the input signal to the pilot valve.

For proper operation of such an arrangement, the valve parts must be constructed with high precision. It is particularly necessary that the metering edges of the valves be machined to very close tolerances so that the area of opening of the power valve may be substantially linear with respect to the displacement of the power valve spool.

Apart from the tolerance problem, however, a fundamental difficulty, with such so-called proportional type control valves is that the flow of fluid is not independent of the load and supply pressure conditions. That is, for a given level of input signal, the fluid flow rate from the power valve is dependent on the load as well as the supply pressure, with the result that the heavier the load on the output device, the smaller will be the flow rate and hence a loss of speed in the output motor. Variations in supply pressure will also result in changes in the speed of the output motor. This load and supply pressure dependency often limits the usefulness of the controller by markedly restricting the effective linear range over which the system may be operated.

It is an object of the present invention to provide flow control apparatus wherein the flow rate may be caused to correspond linearly to the input or control function, substantially independent of the load on the output and of variations in supply pressure and without dependence on precisely machined metering edges in the power valve.

It is also an object of the invention to provide a flow control valve of novel and compact construction and arrangement, wherein the pilot and power valves, the input transducer, and the flow rate responsive means are combined in a unitary apparatus capable of effective embodiment in a wide variety of systems and apparatus for fluid power control purposes.

The invention is illustrated, according to a preferred embodiment, in FIG. 1 of the drawings, the showing of certain portions of the apparatus being shown in partly schematic fashion for clarity of representation.

FIG. 2 is a block-diagram representation of the control apparatus of the invention in terms of its functional elements and their interrelation, so as to illustrate the distinctive aspects of the system and its mode of operation.

Figure 3:
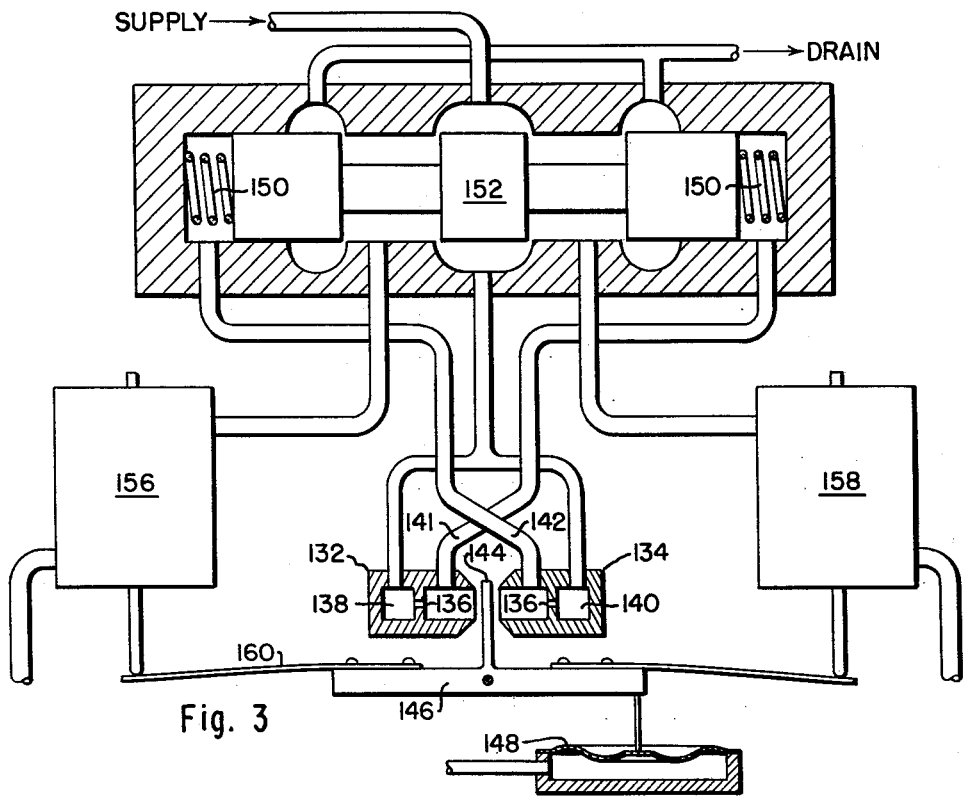
FIG. 3 is a partly schematic representation of a modified embodiment of fluid flow controller but utilizing the flow rate compensation features of the apparatus shown in FIG. 1.

Referring to FIG. 1 of the drawings, the basic components are generically identified as the input transducer 12, the pilot valve 14, power valve 16, and flow rate sensing means 18. As has been previously indicated, the showing of FIG. 1 is partly diagrammatic and in a considerably enlarged scale as compared with valve configurations actually constructed in accordance with the invention.

The input transducer 12 is illustrated as being of the electro-magnetic type, commonly termed a torque motor. It is illustrated as embodying an E-core 22 having pairs of windings 24 and 26 adapted to be energized by electrical signals from the output of a typical amplifier, not shown. The armature 28 of the torque motor is pivoted for rocking movement in response to a signal of variable sign and magnitude. The input transducer may be of other conventional type, however, or if the input signal is a force or displacement, the electro-mechanical type of transducer may be omitted.

The pilot valve 14, by which the power valve 16 is controlled as a two stage system, is adapted for operation on either gas or liquid. The pilot valve is of the balanced, four-way type. The valve body comprises a block 34 in which are mounted axially aligned and spaced tubes 36 having sharp edges at each end. The valve spool is formed by a wire or small-diameter rod 38 having a disc 40 secured to the mid point, intermediate the opposed inner edges of the tubes 36. The rod 38 extends axially through the tubes 36 and is secured to and supported by the free ends of cantilevered leaf springs 42 secured to the valve body.

The valve spool of the pilot valve is reciprocated axially of the tubes by means of connections from the armature 28 of the torque motor 12. For this purpose a bell crank lever 44 serves to transmit armature motion from upstanding link 46 to the end of the valve spool rod 38 projecting beyond the right hand leaf spring. Because of the very limited amplitudes of movement normally encountered in precision fluid-control apparatus of the type with which the present invention is concerned, the normal resilience of the link 46 and end of rod 38 may be relied upon to accommodate the slight rocking movement incident to operation. Consequently, positive connection may be made to the bell crank and looseness or lost motion may thus be avoided.

The power valve 16 comprises a valve body 52 and spool or piston 54. The power valve is characterized by the fact that the spool or piston may be enclosed within the valve body, without provision for mechanical connection thereto. As will hereinafter more fully appear, the position of the power piston 54 is determined solely by fluid control from the pilot valve, and no external connection, as for derivation of a mechanical or positioned feedback signal, need be made to the power piston.

The power valve is provided with chambers 56, 58 to which fluid is selectively applied under the control of the pilot valve to effect displacement of the power piston in one direction or the other. Fluid under pressure is supplied from a conventional pump or other source, not illustrated, by conduit 62 to the chamber 64 in the valve body. Depending on the direction of power piston displacement, fluid is admitted around main piston 66 to adjacent chamber 68 or 70. Chambers 72 and 74 are exhaust or discharge chambers under the control of lands 76 and 78 at the ends of the spool. Discharge of fluid is to a sump, not shown, from which fluid may be recirculated to the pump in conventional fashion, if the system be a closed system.

The power valve has been illustrated for purposes of clarity as being underlapped. That is, the ports are open slightly when the spool is in centered or neutral position. In an actual valve, there may be considerable overlap provided between the lands on the spool and those on the body, without sacrifice of performance. This is to be contrasted with valves of conventional construction and mode of operation, where the several cooperating lands must be in extremely precise relationship. In a conventional valve, the presence of overlap will result in an inactive zone and consequent unsatisfactory performance.

The manner in which the pilot valve controls the power valve may now be set forth. Fluid under pressure is supplied via conduit 82 to the central chamber 84 of the pilot valve body. When the pilot valve spool is centered, the flow around the disc 40 past the sharp-edge orifices formed by the ends of the tubes 36 divides equally as between the two tubes. The orifices formed between the outer ends of these tubes and the adjacent leaf springs are likewise equal, so that the fluid pressures in conduits 86 and 88 to the power valve are equal. There is thus no unbalance force applied to the power piston to cause a displacement thereof. The discharge from the pilot valve orifices at the outer ends of the tubes, it may be noted, is to the sump, as the pilot valve will customarily be enclosed for convenient return of fluid to the system.

Upon a displacement of the pilot valve spool, a differential fluid pressure is set-up, due both to the relative change in orifices at the inner ends and in the opposite sense at the outer ends. As a consequence, a substantial pressure differential is established upon only a minute movement of the valve spool. Such pressure differential, transmitted via the fluid in conduits 86 and 88, serves to effect a displacement of the power piston, the movement of the power piston continuing as long as the pressure differential exists in power valve chambers 56, 58.

The output of the power valve is in the form of a controlled flow, reversible and of controllable magnitude, utilizing conduits 96 and 98. If flow is from the valve along conduit 96, then the return takes place through conduit 98 and power valve to drain 100. The device to which the controlled flow of fluid is supplied may be a fluid motor, such as a reversible hydraulic motor forming the output of a complete servo system.

In accordance with a feature of the invention, means are provided for sensing the flow rate and applying to the pilot valve a signal based on flow rate, so as to provide effective compensation or correction for flow rate effects. More specifically, the invention provides a system wherein inverse feedback is applied to the system input as a substantially linear function of flow rate, so that the output of the system (i.e., the speed or position of the device or mechanism which is actuated by the fluid supplied by the power valve) may be substantially free of errors due to variations in load as well as variation of supply pressure within the power capabilities of the system.

To this end, the valve system of the invention embodies flow rate sensors 18. Because of the reversible operation customarily desired in the output device, identical sensors are employed in the conduits 96, 98 joining the power valve and the output motor (not illustrated). The sensors are uni-directional devices, operating when the flow is through the device from valve to load, and automatically becoming inoperative for reverse flow. Thus at any one time only one sensor is effective to detect the flow rate and derive a flow rate signal therefrom.

The flow rate sensors 18 comprise a body having inlet and outlet chambers 106, 108. Flow communicaion between inlet and outlet chambers takes place past conical valve disc 110 which is yieldingly urged by spring 112 against a sharp-edged valve seat formed in the body. The valve disc is secured to a rod 114 which slides in the valve body.

Under the influence of fluid flow through the sensor from the power valve to the load, the valve disc 110 is lifted from its seat a distance varying with the flow rate, or volume of fluid per unit time. By reason of the sharp-edged valve seat, the orifice formed between seat and disc is of such configuration that for small openings, the displacement of rod 114 is substantially a linear function of flow. By proportioning the sensor dimensions so that the maximum valve disc motion need be only about one-eighth the diameter of the valve seat (the flow passage diameter adjacent the orifice) for full flow or maximum flow rate conditions, the linear relation is preserved with the requisite precision over the whole flow range, including flow rates close to zero.

The displacement of the flow rate valve disc of each sensor is transmitted by rod 114 to the end of leaf spring 116 secured at its other end to the armature of the torque motor. Thus the flow rate signal is introduced to the system input and combined with the error or control signal supplied to the torque motor. The flow rate feedback signal, it will be noted, is applied in a negative or degenerative sense so as to oppose the action of the torque motor in seeking to effect a continuing displacement of the pilot valve. In other words, the feedback is effective to reduce the stroke of the pilot valve, and thus bring the power piston to rest with a maintained displacement that is sufficient to maintain the desired ouput flow (or operation of the load) substantially independent of the flow rate or load factor on the output.

While one rate sensing device is in operation to generate and introduce into the input a flow rate signal, the sensor in the return line from the load is arranged to be inactive and not to interfere with the discharge of fluid. This is accomplished by the provision of integral check valve means comprising a flat plate 120 that normally seats on the inlet side of the sensor valve disc 110 under the influence of a light spring 122. Passages in the valve disc 110 are thus closed by the plate 120 for flow through the sensor from power valve to load, so that all flow takes place around the valve disc as the valve opens. For reverse flow, during which the sensor in the other conduit is operative to respond to the flow rate, the sensor in the discharge side permits substantially unobstructed flow through lifting of the plate 120 against the relatively weak spring 122.

The two cantilever springs 116 in conjunction with the torque motor 14 accomplish the function of taking the algebraic difference of the flow rate signals produced by the two flow rate sensors. When the flow direction changes the discontinuous nature of the motion of each flow sensor rod 114 will not be noticeable and a net torque is produced on the torque motor armature corresponding to the magnitude of flow rate through the load, and of a sense or sign corresponding to the direction of flow.

Figure 5:
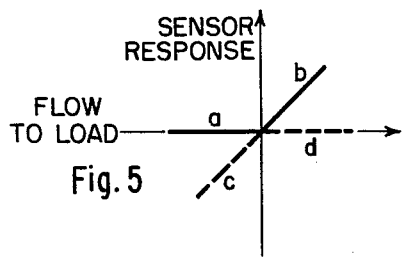
FIG. 5 is a graphical representation of the operation of the flow rate sensors in generating a substantially linear flow rate signal over the range of flows in either direction.

This operation of the flow rate sensors is illustrated graphically in FIG. 5, wherein the solid line portion represents the response of one sensor while the dashed line represents response for the other sensor. Thus, the portion $a$ in the $-x$, $y=0$ region represents the condition of reserve flow through the check valve of one sensor, while the right hand portion $b$ illustratees the linear response of the sensor rod displacement to varying flows in a forward direction. For the other sensor, the conditions are reversed and the linear response is obtained at $c$ for oppositely directed flow with the sensor unresponsive to reverse flow as represented by portion $d$. For the two sensors together the response is represented by lines $c$, $b$ which in effect result in a single straight line through the origin. As a consequence, the resultant signal provided by the pair of sensors is a linearly varying signal as a function of flow rate, with the sign dependent on the direction of flow.

The block diagram, FIG. 2, serves to illustrate the functional relationship of the significant components and parameters of the system in diagrammatic fashion. While most of the blocks are self-explanatory, mention may be made of certain aspects. For example, the torque motor and the flow rate sensors generate forces, with the summing of the input and feedback signals taking place in algebraic fashion, the flow rate feedback signal being applied in a negative sense as shown by the sign (—).

Another factor to note is the manner of control of the power valve position. The power valve is not controlled in proportional relationship to the pilot valve position, but as a time function. That is, the power valve position is not uniquely related to pilot valve position, but takes a position dependent on the extent and duration of pilot valve opening, or relative volumes of fluid differentially established in the chambers 56, 58 at the ends of the power position in response to a control signal. This is because the velocity of the power piston is substantially proportional to the displacement of the pilot valve and consequently the power valve position, or opening, corresponds to the time integral of the pilot valve opening.

Thus, in the block diagram, the flow output from the pilot valve (as determined by net force on the pilot valve, the pilot valve spring constant, and the pilot valve flow characteristics) acts on the power valve area to create a velocity of movement as rate of spool displacement in one direction or the other. The time integral of the pilot valve opening gives the extent of power valve displacement or opening, and the output flow rate is determined by the power valve flow characteristics.

Further it may be noted that the feedback signal, so far as the system of the invention is concerned, is derived not from the output or load device, but from the flow rate of the fluid from the power valve to the load. The flow rate sensor generates a displacement (movement of rod 114) which is converted to a force by springs 116 and combined or mixed with the force generated by the input transducer or motor. This flow-rate feedback loop will generally not be the only feedback loop in the overall system, but for the purposes of the present invention it constitutes the feature by which substantially complete compensation for the effects of varying load conditions on a fluid flow regulating valve may be effectively realized.

It will be appreciated by those skilled in the art that this controller may be utilized to advantage in many forms and types of control systems, both of the open-loop and closed-loop (servo) type. The function to be controlled may be position or velocity, with the advantage that the controlled function is rendered substantially independent of the load or variation of pressure source by reason of the flow controller of the present invention.

The invention is not limited to use in the particular combination illustrated in FIG. 1. By way of example of an alternative embodiment, the arrangement shown in FIG. 3 may be considered. In this embodiment, the pilot valve employs both fixed and variable orifices, as compared with the arrangement of FIG. 1 in which all four orifices are varied.

The pilot valve comprises a pair of sleeves or tubes 132, 134 having sharp edges at their inner ends and closed at their outer ends. For the sake of clarity the supporting body is omitted. Intermediate the ends of the tubes are diaphragms having fixed flow-restricting orifices 136 therein. Fluid is supplied under pressure to the closed chambers 138, 140 back of the diaphragms, while the conduits 141, 142 to the power valve enter the sleeves forwardly of the diaphragms. The movable valve element 144 is disposed between the sharpened ends of the sleeves 132, 134 and is carried by the pivotally mounted rocking member 146 to which motion is imparted from the diaphragm of a bellows unit 148 chosen to illustrate a signal input of the pressure-variation type.

The power valve resembles the power valve shown in FIG. 1, with the difference that compression springs 150 are employed at each end of the spool 152 to provide a centering force. This results in a power valve/pilot valve relationship wherein the power valve position is proportional to pilot valve displacement, though it will be understood that the pilot valve displacements are generally small compared with power valve displacement. Consequently the system may possess high gain, though not attaining the infinite gain characteristics provided by the time integral relation of the FIG. 1 valves.

Thus, for a displacement of the pilot valve in FIG. 3 in response to an input signal via bellows 148, the discharge between one orifice and the valve element will be increased, and correspondingly decreased at the orifice on the other side. This results in a pressure differential in the chambers with which conduits 142 communicate, and this pressure differential operates on the power valve to establish a spool displacement against the centering force of the springs 150.

As in the embodiment of FIG. 1, displacement of the spool of the power valve causes fluid to flow to the load in one direction, and to return through the other conduit. Flow rate sensors 156, 158 are not illustrated in detail as their construction may be the same as the sensors 18 of FIG. 1. Each responds to flow in one direction, one for forward flow to the load and the other to reverse flow, thus giving a signal related in sign and magnitudes to the flow to the output device. This signal is fed back to the input to the pilot valve in the same manner as in the FIG. 1 embodiment, utilizing springs 160 carried at opposite ends of the rocking member 146.

The previous embodiments have involved arrangements wherein the flow rate signal is manifest as a force and is applied to the input through the springs 116 of FIG. 1 and 160 of FIG. 3. In certain types of systems, however, it may be desirable to apply the feedback signal as a displacement, whereby motion of the flow rate sensor results in a displacement of the pilot valve actuator. Expressed in another way, FIG. 1 and FIG. 3 embodiments involve the summing of input and feedback forces for actuating the pilot valve, while the alternative to be described is operative by summing of input and feedback displacements.

Figure 4:
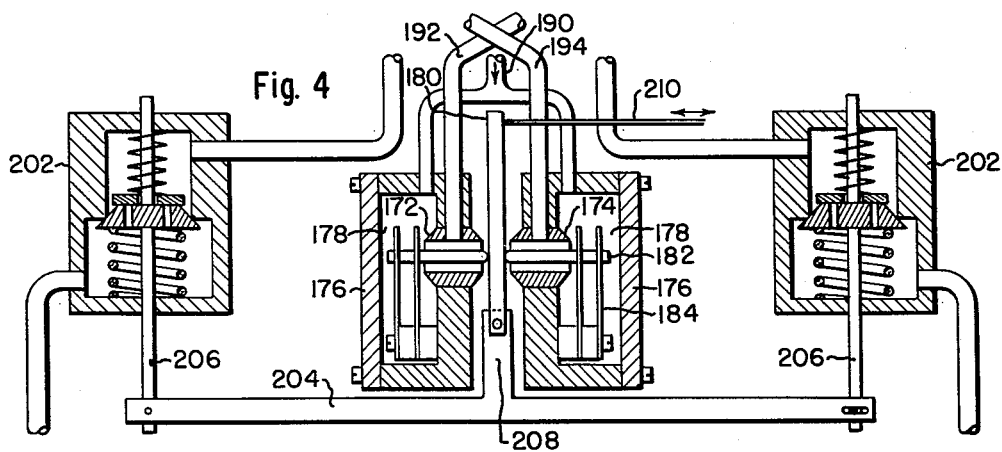
FIG. 4 shows an alternative form of pilot valve suitable for use with the power valve of FIG. 1 and utilizing similar flow rate sensors, but with an alternative form of feedback connection.

In FIG. 4 this alternative is illustrated, only the pilot valve and flow rate sensors being shown since the power valve may be identical with that shown in FIG. 1. The pilot valve, like that of FIG. 1, embodies four variable orifices, but the parts are arranged in somewhat different fashion to provide certain advantages.

The pilot valve employs two aligned sleeves 172, 174, each having sharpened ends to provide, when used in conjunction with a flat member, a variable orifice. The sleeves are mounted in and extend through the facing walls of spaced bodies 176 into closed chambers 178. The sleeves are spaced axially a distance such that valve actuator 180 may operate as the flow controlling element for the orifices on each side.

The flow-controlling orifices at the outer ends of the sleeves are also varied by motion of the valve actuator 180. Rods 182 extend axially through each sleeve, being supported at their outer ends by parallel cantilever flat springs 184 which maintain the rods in contact with the actuator over the range of movement of the latter. The springs, though secured to the rods and clamped to the bodies 176, possess sufficient resiliency to permit substantially rectilinear motion of the rods axially of the sleeves upon rocking movement of the valve actuator 180. The springs nearest the sleeve ends likewise serve as movable valve elements to control the flow at the outer ends of the sleeves.

In this embodiment, opposite to that of FIG. 1, the fluid supply is to the orifices at the outer ends of the sleeves while the discharge to drain is from the inner ends. Thus, supply conduit 190 branches to the chamber 178, with the conduits 192 to the power valve communicating with the sleeves intermediate their orifices. While this pilot valve construction provides the same high order of sensitivity as the embodiment of FIG. 1, due to the provision of four variable orifices instead of two variable and two fixed, it possesses special advantages of ease of assembly and disassembly. Thus, the orifices may readily be inspected or cleaned by removing the covers to the bodies 176, unscrewing the cantilever spring mounting screws and withdrawing the spring and rod assemblies intact.

The flow rate sensors illustrated at 202 are of the same construction and mode of operation as those shown in FIG. 1 and need not again be described. Instead of resilient feedback connections, however, provision is made for direct positional coupling to the pilot valve actuator 180. This is illustrated as a link 204 pivotally connected at each end to a sensor output rod 206. At one end the link is preferably slotted to accommodate the slight variations in separation of the pivots as one or the other of the sensor rods moves downwardly in response to fluid flow through that sensor.

At its midpoint the link 204 carries an upstanding arm 208 which provides the fulcrum point for the end of the pilot valve actuator 180. The other end of the actuator 180 is rocked to one side or the other in response to an input signal from an input device, not shown, connected by link 210.

When the system is in its quiescent state, with the input device in zero or no-signal position, both flow sensors will have their valves seated and the link 204 will be in a position such that the arm 208 centers the valve actuator midway between the sleeve ends. The flow under pressure from the supply will take place equally into the sleeves from the chambers 178, and without unbalance also from the orifices past the actuator. The pressure drops being equal, there will be no pressure difference existing in conduits 192, 194 to operate the power valve.

Upon receiving a signal from the input device via link 210, the valve actuator will be rocked about its fulcrum in arm 208. The pressure difference which results from the varying of the four orifices in the pilot valve will cause a displacement of the power valve, whether it be of the type shown in FIG. 1 or that of FIG. 3. Opening of the power valve and consequent supply of fluid to the load will bring about an opening of one of the flow rate sensors, the extent of motion of the output rod thereof being substantially a linear function of the flow rate as heretofore described and as shown graphically in FIG. 5.

The displacement of one sensor rod from its zero-flow position will operate to swing the link 204 about its pivotal connection to the other sensor rod which remains in closed position. The rocking of link 204 causes the arm 208 to swing with a lateral component sufficient to displace the fulcrum point for the pilot valve actuator 180 slightly to one side of normal centered position. The direction of this displacement is such as to diminish the flow of fluid to the power valve, as in the other embodiments, hence the feedback may be termed negative or degenerative. In this embodiment the feedback is primarily in terms of displacement, since the pilot valve actuator is a "floating" lever, as distinguished from the arrangements of the prior embodiments where the feedback signal is applied as a force resiliently opposing the force developed by the signal input device, the torque motor 12 of FIG. 1 or the bellows 148 of FIG. 3.

It will be noted that the conduits 141, 142 of FIG. 3 and the conduits 192, 194 of FIG. 4 are cross-connected to the power valve in order that the feedback signal may be applied in the proper direction to the pilot valve.

While the invention has been illustrated and described in terms of embodiments wherein the several parts thereof are in spaced and enlarged and therefore somewhat schematic relation, it will be understood that the invention is not limited to the particular configurations and relationships shown, but may be embodied in apparatus of highly compact construction and relationship, while embodying the principles and mode of operation of the system as herein described and claimed.

Having thus described the invention, I claim:

1. A fluid flow controller comprising a power valve having a valve spool, a fluid inlet and a pair of fluid outlets for reversibly controlling the flow of fluid to a load, the power valve having chambers at the ends of the spool, a pilot valve, conduits between pilot valve and the chambers in the power valve for positioning the power valve spool by the relative fluid volumes in said chambers, signal input means coupled to the pilot valve, a pair of flow rate responsive means intermediate the power valve and the load, there being one flow rate responsive means in flow communication with each fluid outlet from the power valve to the load, and connections between the flow rate responsive means and the pilot valve for modifying the pilot valve response to the signal input means as a substantially linear function of flow rate from the power valve.

2. A fluid flow controller comprising a power valve having a valve spool, a fluid inlet and a pair of fluid outlets for reversibly controlling the flow of fluid to a load, the power valve having chambers at the ends of the spool, a pilot valve, conduits between pilot valve and the chambers in the power valve for positioning the power valve spool by the relative fluid volumes in said chambers, signal input means coupled to the pilot valve, a pair of flow rate responsive means intermediate the power valve and the load, there being a flow rate responsive means in flow communication with each fluid outlet from the power valve to the load, and resilient connections between each flow rate responsive means and the signal input means for applying degeneratively a force to the signal input means as a substantially linear function of flow rate from the power valve.

3. A fluid flow controller comprising a power valve having a valve spool, a fluid inlet and a pair of fluid outlets for reversibly controlling the flow of fluid to a load, the power valve having chambers at the ends of the spool, a pilot valve, conduits between pilot valve and the chambers in the power valve for positioning the power valve spool by the relative fluid volumes in said chambers, signal input means coupled to the pilot valve, said signal input means comprising a member pivotally mounted for rocking movement in response to a control signal, a pair of flow rate responsive means intermediate the power valve and the load, there being a flow rate responsive means in flow communication with each fluid outlet from the power valve to the load, and resilient connections between each flow rate responsive means and the signal input means for applying degeneratively a force to the signal input means as a substantially linear function of flow rate from the power valve, said resilient connections comprising leaf springs extending from the pivotally mounted member and engaged by the flow responsive means.

4. A fluid flow controller comprising a power valve having a valve spool, a fluid inlet and a pair of fluid outlets for reversibly controlling the flow of fluid to a load, the power valve having chambers at the ends of the spool, a pilot valve, conduits between pilot valve and the chambers in the power valve for positioning the power valve spool by the relative fluid volumes in said chambers, a pair of flow rate responsive means intermediate the power valve and the load, there being a flow rate responsive means in flow communication with each fluid outlet from the power valve to the load, the flow responsive means each having a movable element actuated by fluid flow through the device, a link pivotally connected to each movable element of the flow responsive means, a pilot valve actuator having one portion thereof pivotally connected to the link, and signal input means coupled to the valve actuator at another portion thereof whereby the pilot valve actuation is by the positional resultant of the displacements of the link and the signal input means.

5. A hydraulic transfer servo system comprising a control valve and a controlled valve, each of which has a null position; an inlet connecting a source of fluid pressure with said valves; a pair of outlets fluidly interconnected with said controlled valve; said control valve being operatively interconnected with said controlled valve whereby movement of said control valve from its null position effects movement of said controlled valve from its null position to connect either of said outlets with said source of fluid pressure, and final displacement of said control valve being determined by the amount of an input force; and means defining a flow sensing means operatively interconnected with either of said outlets and said control valve, said flow sensing means being adapted to cooperate with said control valve to overcome said input force thus positioning said controlled valve in its final displacement according to the desired flow through said outlets and to control movement of said control valve to thereby cause movement of said controlled valve toward its null position upon discontinuance of said input force.

6. A fluid transfer valve for translating electrical input signals into hydraulic output flow comprising a torque motor responsive to said electrical input signals, a control valve responsive to said torque motor, a controlled valve responsive to said control valve, an inlet and a pair of outlets fluidly interconnected with said controlled valve whereby movement of said controlled valve connects said inlet with either of said outlets, said inlet being connected with a source of fluid pressure and said outlets being connected with a flow responsive device, and flow sensing means operatively interconnected with either of said outlets and said control valve, said flow sensing means being responsive to flow through said outlets to control the position of said control valve according to the input signal received by said torque motor.

7. A fluid transfer valve for translating electrical input signals into hydraulic output flow comprising a torque motor responsive to said electrical input signals, a control valve responsive to said torque motor, a controlled valve responsive to said control valve, an inlet and a pair of outlets fluidly interconnected with said controlled valve whereby movement of said controlled valve connects said inlet with either of said outlets, said inlet being connected with a source of fluid pressure and said outlets being connected with a flow responsive device, and flow sensing means operatively interconnected with either of said outlets and said control valve, said flow sensing means being responsive to flow through said outlets to control the position of said control valve according to the input signal received by said torque motor, said flow sensing means comprising means defining a variable orifice.

8. A fluid flow controller comprising a power valve having a pair of fluid outlets for reversible flow communication with a load, a pilot valve, signal input means coupled to the pilot valve, fluid conduit means between pilot valve and power valve for positioning the power valve under the control of the pilot valve, flow rate measuring means connected to the fluid outlets of the power valve and responsive to the direction and rate of flow between power valve and load for generating a signal as a substantially linear function of flow rate, and connections between the flow rate measuring means and the pilot valve to apply degeneratively to the pilot valve the flow rate signal derived from the rate of fluid flow between power valve and the load.

9. A fluid flow controller comprising a power valve having a pair of fluid outlets for reversible flow communication with a load, a pilot valve, signal input means coupled to the pilot valve, fluid conduit means between pilot valve and power valve for positioning the power valve under the control of the pilot valve, flow rate measuring means connected to the fluid outlets of the power valve and responsive to the direction and rate of flow between power valve and load for generating a displacement as a substantially linear function of flow rate, and resilient connections between the flow rate measuring means and the pilot valve to apply degeneratively to the pilot valve a force as a function of the flow rate between power valve and load.

10. A fluid flow controller comprising a power valve having a pair of fluid outlets for reversible flow communication with a load, a pilot valve, displaceable signal input means coupled to the pilot valve, fluid conduit means between pilot valve and power valve for positioning the power valve under the control of the pilot valve, flow rate measuring means connected to the fluid outlets of the power valve and responsive to the direction and rate of flow between power valve and load for generating a displacement as a substantially linear function of flow rate, and connections between the flow rate measuring means and the pilot valve for positioning the pilot valve as the resultant of the displacements of the signal input means and flow rate measuring means.

11. A fluid flow controller comprising a power valve having a pair of fluid outlets for reversible flow communication with a load, a pilot valve, signal input means coupled to the pilot valve, fluid conduit means between pilot valve and power valve for positioning the power valve under the control of the pilot valve, flow rate measuring means connected to the fluid outlets of the power valve and responsive to the direction and rate of flow between power valve and load for generating a signal as a substantially linear function of flow rate, said means comprising a body having inlet and outlet chambers, a sharp-edged valve seat intermediate said chambers, a valve cooperating with the valve seat, resilient means urging the valve toward the seat, and connections between the valve and the pilot valve for applying degeneratively to the pilot valve a flow rate signal derived from the displacement of the valve from its seat upon the flow of fluid past the seat.

12. A fluid flow controller comprising a power valve having a pair of fluid outlets for reversible flow communication with a load, a pilot valve, signal input means coupled to the pilot valve, fluid conduit means between pilot valve and power valve for positioning the power valve under the control of the pilot valve, flow rate measuring means connected to the fluid outlets of the power valve and responsive to the direction and rate of flow between power valve and load for generating a signal as a substantially linear function of flow rate, said means comprising a body having inlet and outlet chambers, a sharp-edged valve seat intermediate said chambers, a valve cooperating with the valve seat, resilient means urging the valve toward the seat, means actuated by the valve upon movement from the seat during fluid flow from inlet to outlet chambers past the valve seat, connections between the valve actuated means and the pilot valve for applying degeneratively to the pilot valve a flow rate signal derived from the displacement of the valve from its seat, and check valve means permitting reverse flow of fluid between load and power valve by-passing the seat of the flow-rate measuring means.

13. A fluid flow controller comprising a power valve having a pair of fluid outlets for reversible flow communication with a load, a pilot valve, signal input means coupled to the pilot valve, fluid conduit means between pilot valve and power valve for positioning the power valve under the control of the pilot valve, flow rate measuring means connected to the fluid outlets of the power valve and responsive to the direction and rate of flow between power valve and load for generating a signal as a substantially linear function of flow rate, said means comprising a body having inlet and outlet chambers, a sharp-edged valve seat intermediate said chambers, a valve cooperating with the valve seat, resilient means urging the valve toward the seat, means actuated by the valve upon movement from the seat during fluid flow from inlet to outlet chambers past the valve seat, connections between the valve actuated means and the pilot valve for applying degeneratively to the pilot valve a flow rate signal derived from the displacement of the valve from its seat, the valve having a passage therethrough from the outlet to the inlet chambers, and a check valve disc resiliently engaging the valve on the side adjacent the inlet chamber to permit reverse flow of fluid through the flow rate means from outlet to inlet chambers while the valve remains seated, the check valve disc blocking the flow of fluid through the passage in the valve from inlet to outlet chambers.

14. A fluid flow controller comprising a power valve having a fluid outlet for flow communication with a load, a pilot valve, signal input means coupled to the pilot valve, fluid conduit means between pilot valve and power valve for positioning the power valve under the control of the pilot valve, variable-orifice flow rate measuring means connected to the fluid outlet of the power valve and having a displaceable member responsive to the rate of flow between power valve and load for generating a signal as a substantially linear function of flow rate, and connections between the displaceable member of the flow rate measuring means and the pilot valve to apply degeneratively to the pilot valve the flow rate signal derived from the rate of fluid flow between power valve and the load.

15. A fluid flow controller comprising a power valve having a fluid outlet for flow communication with a load, a pilot valve, signal input means coupled to the pilot valve, fluid conduit means between pilot valve and power valve for positioning the power valve under the control of the pilot valve, variable-orifice flow rate measuring means connected to the fluid outlet of the power valve and having a displaceable member responsive to the rate of flow between power valve and load for generating a displacement as a substantially linear function of flow rate, and connections between the displaceable member of the flow rate measuring means and the pilot valve to apply degeneratively to the pilot valve a force as a substantially linear function of the rate of fluid flow between power valve and the load.

16. A fluid flow controller comprising a power valve having a fluid outlet for flow communication with a load, a pilot valve, signal input means coupled to the pilot valve, fluid conduit means between pilot valve and power valve for positioning the power valve under the control of the pilot valve, variable-orifice flow rate measuring means connected to the fluid outlet of the power valve and having a displaceable member responsive to the rate of flow between power valve and load for generating a displacement as a substantially linear function of flow rate, and connections between the displaceable member of the flow rate measuring means and the pilot valve to apply degeneratively to the pilot valve a displacement as a substantially linear function of the rate of fluid flow between power valve and the load.

17. A fluid flow controller comprising a power valve having a fluid outlet for flow communication with a load, a pilot valve, signal input means coupled to the pilot valve, fluid conduit means between pilot valve and power valve for positioning the power valve under the control of the pilot valve, variable-orifice flow rate measuring means connected to the fluid outlet of the power valve and having a displaceable member responsive to the rate of flow between power valve and load for generating a signal as a substantially linear function of flow rate, said means comprising a body having inlet and outlet chambers, a sharp-edged valve seat intermediate said chambers, a valve cooperating with the valve seat, resilient means urging the valve toward the seat, and connections between the valve and the pilot valve for applying degeneratively to the pilot valve a flow rate signal derived from the displacement of the valve from its seat upon the flow of fluid past the seat.

References Cited in the file of this patent

UNITED STATES PATENTS

| | | |
|---|---|---|
| 577,489 | Mills | Feb. 23, 1897 |
| 2,495,160 | Davis | Jan. 17, 1950 |
| 2,503,447 | May | Apr. 11, 1950 |
| 2,509,958 | Burn | May 30, 1950 |
| 2,524,055 | Hubert | Oct. 3, 1950 |
| 2,582,088 | Walthers | Jan. 8, 1952 |
| 2,662,540 | Rutherford et al. | Dec. 15, 1953 |
| 2,669,246 | Segerstad | Feb. 16, 1954 |
| 2,675,826 | Kehoe | Apr. 20, 1954 |
| 2,709,421 | Avery | May 31, 1955 |
| 2,730,124 | Buchanan | Jan. 10, 1956 |